(12) United States Patent
Hojoh

(10) Patent No.: US 10,852,207 B2
(45) Date of Patent: Dec. 1, 2020

(54) VACUUM GAUGE

(71) Applicant: Q'z Corporation, Kodaira (JP)

(72) Inventor: Hisao Hojoh, Kodaira (JP)

(73) Assignee: Q'z Corporation, Tokyo (JP)

(*) Notice: Subject to any disclaimer, the term of this patent is extended or adjusted under 35 U.S.C. 154(b) by 144 days.

(21) Appl. No.: 16/211,384

(22) Filed: Dec. 6, 2018

(65) Prior Publication Data

US 2019/0107458 A1   Apr. 11, 2019

Related U.S. Application Data

(63) Continuation of application No. PCT/JP2017/024139, filed on Jun. 30, 2017.

(30) Foreign Application Priority Data

Jan. 6, 2017   (JP) .................................. 2017-001298

(51) Int. Cl.
   *G01L 21/10*   (2006.01)
   *G01L 9/00*   (2006.01)
   *G01L 21/00*   (2006.01)

(52) U.S. Cl.
   CPC ............... *G01L 21/10* (2013.01); *G01L 9/00* (2013.01); *G01L 9/008* (2013.01); *G01L 21/00* (2013.01)

(58) Field of Classification Search
   None
   See application file for complete search history.

(56) References Cited

U.S. PATENT DOCUMENTS

| 5,424,598 A | 6/1995 | Corbett |
| 2002/0033050 A1 | 3/2002 | Shibata et al. |

(Continued)

FOREIGN PATENT DOCUMENTS

| CN | 101634598 A | 1/2010 |
| CN | 203908729 U | 10/2014 |

(Continued)

OTHER PUBLICATIONS

International Search Report and Written Opinion (Application No. PCT/JP2017/024139) dated Jul. 25, 2017.

(Continued)

*Primary Examiner* — Harshad R Patel
*Assistant Examiner* — Nigel H Plumb
(74) *Attorney, Agent, or Firm* — Burr & Brown, PLLC

(57) ABSTRACT

A vacuum gauge includes an introduction tube, a diaphragm displaced by a gas to be measured that is introduced from the introduction tube, a piezoelectric element that has one end coupled to the diaphragm and is displaced along with the diaphragm, an inner structure to which a circumferential edge of the diaphragm and the other end of the piezoelectric element are secured and that is coupled to the introduction tube, and an airtight container to airtightly enclose the introduction tube and the inner structure. The inner structure, the introduction tube, and the diaphragm airtightly partition a space in the airtight container into a pressure introduction chamber to which the gas to be measured is introduced on one surface side of the diaphragm, and a reference pressure chamber on the other surface side of the diaphragm. the reference pressure chamber being set at a high vacuum that is lower than the pressure lower limit of the measurement gas.

7 Claims, 6 Drawing Sheets

(56) References Cited

U.S. PATENT DOCUMENTS

2010/0018318 A1  1/2010  Watanabe et al.
2013/0118263 A1  5/2013  Sato et al.
2014/0238141 A1  8/2014  Brown

FOREIGN PATENT DOCUMENTS

| JP | H02-228585 A1 | 9/1990 |
| JP | 2001-311673 A1 | 11/2001 |
| JP | 2010-048798 A1 | 3/2010 |
| JP | 2013-104753 A1 | 5/2013 |
| JP | 2014-126423 A1 | 7/2014 |

OTHER PUBLICATIONS

Chinese Office Action (Application No. 201780050129.5) dated Jun. 30, 2020 (with English translation).
Extended European Search Report (Application No. 17889729.4) dated Jul. 14, 2020.

VACUUM GAUGE

CROSS REFERENCE TO RELATED APPLICATION

This application is a continuation of International Patent Application No. PCT/JP2017/024139, having an international filing date of Jun. 30, 2017, which designated the United States, the entirety of which is incorporated herein by reference. Japanese Patent Application No. 2017-001298 filed on Jan. 6, 2017 is also incorporated herein by reference in its entirety.

BACKGROUND

The present disclosure relates to a vacuum gauge and other similar devices.

Physical quantity detectors with piezoelectric elements have been known. JP-A-2013-104753 discloses a physical quantity detector including a piezoelectric element having a base on each of opposite ends, and an airtight container (housing) to contain the piezoelectric element. The housing includes a ring portion to secure a diaphragm, a protruding portion that protrudes from the ring portion, two pillar members that vertically extend from the protruding portion, and a beam member that couples free ends of the two pillar members to each other. The base on one end of the piezoelectric element is secured to the diaphragm whereas the base on the other end of the piezoelectric element is secured to the beam member. When an external pressure is exerted on the diaphragm, the piezoelectric element is compressed or expanded in accordance with the external pressure. Correspondingly, the pressure received by the diaphragm causes a resonance frequency of the piezoelectric element to change so as to detect the pressure highly accurately based on the resonance frequency.

With the physical quantity detector of the above-described configuration, however, particularly in the case where a positive or negative pressure exerted on the diaphragm is large or in the case where a change of outside temperature is large, measurement accuracy is unfortunately degraded.

SUMMARY

According to one aspect of the disclosure, there is provided a vacuum gauge comprising:
an introduction tube;
a diaphragm configured to be displaced by a gas to be measured that is introduced from the introduction tube;
a piezoelectric element having one end coupled to the diaphragm, and configured to be displaced along with the diaphragm;
an inner structure to which a circumferential edge of the diaphragm and another end of the piezoelectric element are secured, the inner structure being coupled to the introduction tube; and
an airtight container configured to airtightly enclose the introduction tube and the inner structure,
the inner structure, the introduction tube, and the diaphragm airtightly partitioning a space in the airtight container into a pressure introduction chamber to which the gas to be measured is introduced on one surface side of the diaphragm, and a reference pressure chamber on another surface side of the diaphragm,
the reference pressure chamber being set at a high vacuum that is lower than a pressure lower limit of the gas to be measured.

DESCRIPTION OF EXEMPLARY EMBODIMENTS

Figure 1:
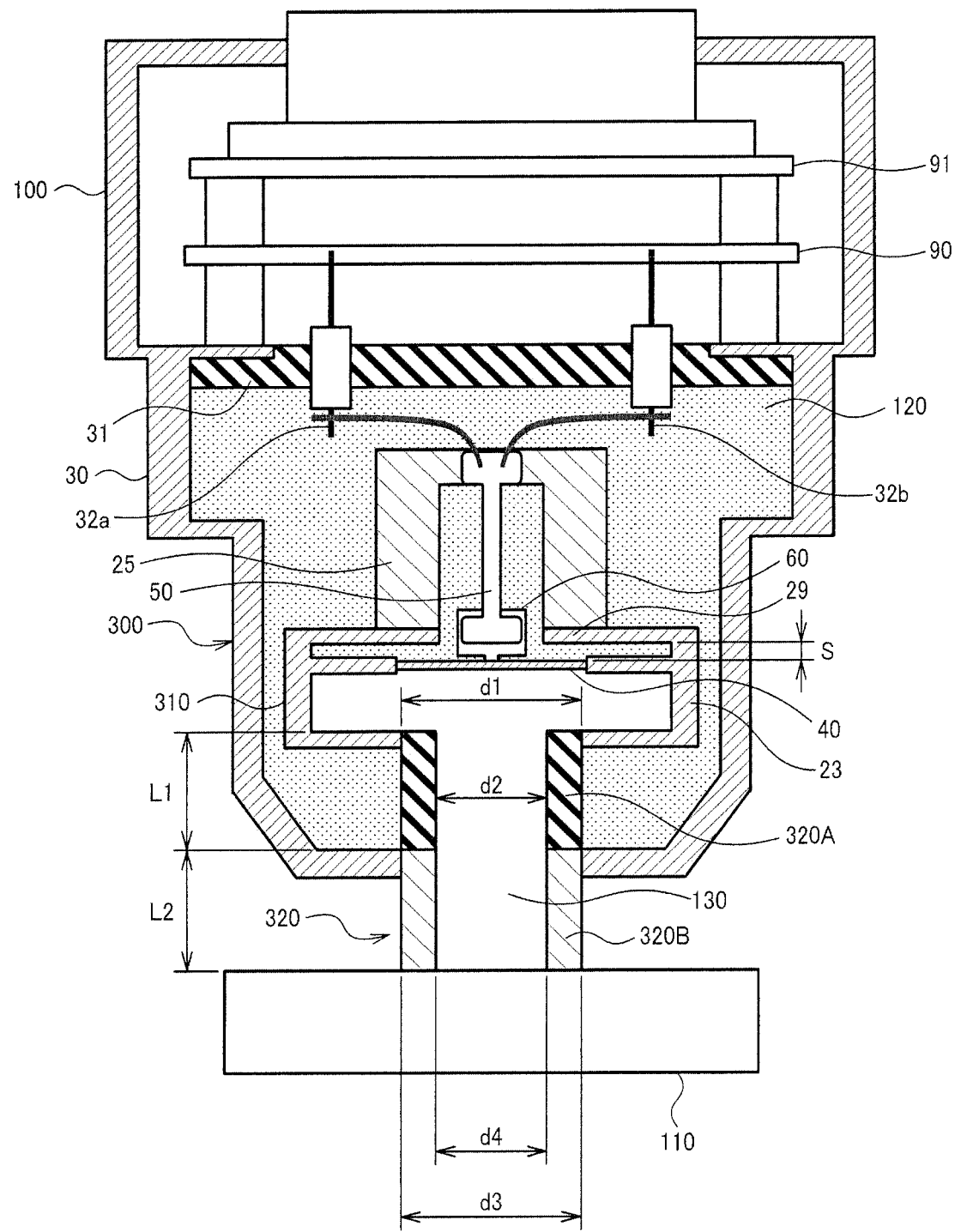
FIG. 1 is a cross-sectional view of an embodiment of the present disclosure in which a vacuum heat-insulating portion is combined with an introduction tube of a low heat-transfer material.

An object of some aspects of the present disclosure is to provide a vacuum gauge that can suppress an influence of changes of outside temperature and accurately measure a vacuum degree.

An object of other aspects of the present disclosure is to provide a vacuum gauge that allows for a displacement of one end of a piezoelectric element and reduces a displacement of the other end to accurately measure a vacuum degree.

(1) In accordance with one of some embodiments, there is provided a vacuum gauge comprising:
an introduction tube;
a diaphragm configured to be displaced by a gas to be measured that is introduced from the introduction tube;
a piezoelectric element having one end coupled to the diaphragm, and configured to be displaced along with the diaphragm;
an inner structure to which a circumferential edge of the diaphragm and another end of the piezoelectric element are secured, the inner structure being coupled to the introduction tube; and
an airtight container configured to airtightly enclose the introduction tube and the inner structure,
the inner structure, the introduction tube, and the diaphragm airtightly partitioning a space in the airtight container into a pressure introduction chamber to which the gas to be measured is introduced on one surface side of the diaphragm, and a reference pressure chamber on another surface side of the diaphragm,
the reference pressure chamber being set at a high vacuum that is lower than a pressure lower limit of the gas to be measured.

The most significant factor of an error of the vacuum gauge is that even though the pressure is unchanged, a change in ambient temperature causes deformation of the diaphragm, the piezoelectric element, or the inner structure supporting the piezoelectric element, resulting in error due to displacement of the piezoelectric element. In order to avoid such an error, except the one surface side of the diaphragm that is in contact with the gas to be measured, the reference pressure chamber covers the other surface side of the diaphragm, the piezoelectric element, and the inner structure supporting these components. The reference pressure chamber is originally to set a reference pressure with respect to the pressure of the gas to be measured that is introduced to the pressure introduction chamber. According to one aspect of the present disclosure, a high vacuum of the reference pressure chamber is made to function also as a vacuum heat-insulating portion, which suppresses convection heat transfer so as to reduce an influence due to a temperature change, which is the most significant factor of the error of the vacuum gauge.

(2) In accordance with one of some embodiments, the reference pressure chamber is set at a high vacuum of $\frac{1}{1000}$ or less or preferably $\frac{1}{10000}$ or less of the pressure lower limit of the gas to be measured. This makes it possible to perform measurement with high accuracy of 0.1% or less without any effect by the pressure in the reference pressure chamber and enhance the function of the reference pressure chamber as the vacuum heat-insulating portion.

(3) In the vacuum gauge, the introduction tube may comprise a first portion and a second portion, the first portion being coupled to the inner structure and enclosed by the airtight container, the second portion protruding outward from the airtight container, and one of the first portion and the second portion may have a lower heat conductivity than another of the first portion and the second portion. This can suppress transfer of the heat outside the airtight container to the inner structure by solid heat conduction through the introduction tube extending inside and outside the airtight container where the vacuum heat-insulating portion is defined.

(4) In the vacuum gauge, the first portion of the introduction tube may have a first tube volume that is $\frac{1}{2}$ to $\frac{1}{6}$ of a second tube volume of the second portion of the introduction tube. A tube volume is represented by the product of an opening cross-sectional area and a length of a tube. As the tube volume of the first portion of the introduction tube is decreased to $\frac{1}{2}$ to $\frac{1}{6}$, the heat conductivity is decreased in proportion to the tube volume.

(5) In the vacuum gauge, the introduction tube may comprise a first portion and a second portion, the first portion being coupled to the inner structure and enclosed by the airtight container, the second portion protruding outward from the airtight container, and at least one of the first portion and the second portion may comprise a material having a heat conductivity of 2 to 10 W/m·K.

According to one aspect of the present disclosure, in the case of including the introduction tube extending inside and outside the airtight container where the vacuum heat-insulating portion is defined, solid heat conduction is suppressed by the introduction tube that has at least one of the first portion and the second portion made of a material having a low heat conductivity of 2 to 10 W/m·K so as to reduce an influence of an outside temperature change received by the piezoelectric element to enable accurate pressure measurement. Thus, a temperature increase speed in the vicinity of the piezoelectric element in increasing an outside temperature from 25° C. to 30° C. in 20 seconds can be made $5 \times 10^3$ (° C./sec) or less. Consequently, temperature correction at approximately every two seconds becomes possible with temperature accuracy of at least 0.01° C. As a result, it is possible to make the temperature correction follow the temperature change in real time.

(6) In the vacuum gauge, the inner structure may comprise:

a proximal end portion to which the circumferential edge of the diaphragm is secured;

a securing portion to which the other end of the piezoelectric element is secured; and a reinforcement portion extending from the proximal end portion to the securing portion along a longitudinal direction of the piezoelectric element, the reinforcement portion may be disposed in a range of (360°/N) (1<N≤2) around a region where the piezoelectric element is disposed in a cross section of the reinforcement portion perpendicular to the longitudinal direction.

This enables the reinforcement portion to steadfastly support the securing portion to which the other end of the piezoelectric element is secured. Thus, the piezoelectric element, one end of which is displaced along with the diaphragm, has the other end secured and supported to the securing portion so as to cause a stress dependent only on the pressure to be exerted on the piezoelectric element.

(7) In the vacuum gauge, the inner structure may comprise a stopper configured to restrict excessive displacement of the diaphragm into the airtight container.

Thus, the stopper restricts displacement of the diaphragm, thereby making it possible to set the upper limit pressure allowable in the vacuum gauge.

A preferred embodiment of the present disclosure will be described in detail below. The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected of coupled to each other with one or more other intervening elements in between.

1. Vacuum Gauge with Vacuum Heat-Insulating Portion

FIG. 1 is a schematic cross-sectional view of a vacuum gauge according to an embodiment of the present disclosure. The vacuum gauge illustrated in FIG. 1 includes an airtight container 300, an inner structure 310 disposed in the airtight container 300, and an introduction tube 320 to which a gas to be measured is introduced. The introduction tube 320 includes a first portion 320A coupled to the inner structure 310 and surrounded by the airtight container 300. The introduction tube 320 may further include a second portion 320B coupled to the first portion 320A and protruding outward from the airtight container 300. A flange 110 is secured to a free end of the second portion 320B of the introduction tube 320. The flange 110 is secured to communicate with a chamber or a pipe that contains the gas to be measured.

One end of a piezoelectric element 50 is connected to a diaphragm 40. In the present embodiment, a bonding portion 60 to which one end of the piezoelectric element 50 is bonded is adhered and secured to a central portion of the diaphragm 40. The other end of the piezoelectric element 50 is secured to the inner structure 310.

A crystal unit or preferably a double tuning fork crystal unit may be used for the piezoelectric element 50, which is displaced along with the diaphragm 40. Here, the airtight container 300 is formed by airtightly combining, for example, a tubular member 30 and a partition wall 31. As illustrated in FIG. 1, through the partition wall 31, two wires 32a and 32b connected to the piezoelectric element 50 are taken out while airtightness is maintained. In the case of providing a temperature sensor to measure a temperature in the vicinity of the piezoelectric element 50, two wires connected to the temperature sensor are additionally taken out through the partition wall 31. Another tubular member 100 is secured outside the partition wall 31, and circuit boards 90 and 91 connected to the two wires 32a and 32b and other components are disposed in the tubular member 100. With the circuit boards 90 and 91 and the wires 32a and 32b, a voltage is applied between a pair of excitation electrodes of the piezoelectric element 50 to excite the piezoelectric element 50 at a natural resonance frequency. When the piezoelectric element 50, which is directly connected to the diaphragm 40 displaced by the gas to be measured, receives a compressive stress, the resonance frequency decreases. Conversely, when the piezoelectric element 50 receives a tensile stress, the resonance frequency increases. Consequently, based on the resonance frequency, the pressure is detected highly accurately.

The first portion 320A of the introduction tube 320 and the inner structure 310 are airtightly enclosed by the airtight container 300, and the second portion 320B of the introduction tube 320 protrudes outward from the airtight container 300.

The inner structure 310, the first portion 320A of the introduction tube 320, and the diaphragm 40 airtightly partition a space in the airtight container 300 into a pressure introduction chamber 130 on one surface side of the diaphragm 40, to which the gas to be measured is introduced, and a reference pressure chamber 120 on the other surface side of the diaphragm 40. Here, the reference pressure chamber 120 is set at a high vacuum that is lower than the pressure lower limit of the gas to be measured.

In order to perform measurement highly accurately without any effect by a pressure in the reference pressure chamber 120, the pressure in the reference pressure chamber 120 may be set at $1/1000$ or less or preferably $1/10000$ or less of a minimum measurement pressure (pressure lower limit). For example, in the case where a minimum measurement pressure (pressure lower limit) in the pressure introduction chamber 130 is set at 0.1 Pa, preferably, the pressure in the reference pressure chamber 120 is set at $1/1000$ or less of the minimum measurement pressure, that is, $1 \times 10^{-4}$ Pa or less to perform measurement with high accuracy of 0.1% or less without any effect by the pressure in the reference pressure chamber 120. A method that includes activating a bulk getter material in a high vacuum, performing chipping-off, and evacuating the reference pressure chamber 120 by a bulk getter pump may be adopted to maintain the reference pressure chamber 120 at $1 \times 10^{-4}$ Pa or less for a long term (for example, 30 years).

With the pressure introduction chamber 130 being set at an atmospheric pressure or a pressure by purge gas in an initial state, the diaphragm 40 is at a position displaced inside the reference pressure chamber 120 (or the diaphragm 40 is at a position restricted by a stopper 29, described later). Then, the gas to be measured in a vacuum chamber is introduced to the pressure introduction chamber 130 through the flange 110 and the introduction tube 320, and when the pressure introduction chamber 130 is evacuated, the diaphragm 40, which has been at the position inside the reference pressure chamber 120, is displaced outside the reference pressure chamber 120. Since the piezoelectric element 50 having one end connected to the diaphragm 40 has the other end secured to the inner structure 310, a stress is exerted on the piezoelectric element 50. The piezoelectric element 50 is connected to an oscillator circuit, and in response to the stress generated by displacement of the diaphragm 40 caused by the pressure, the frequency of the piezoelectric element 50 is changed. The frequency is divided into, for example, $1/64$ by a frequency divider, and counted by a frequency counter to measure the pressure. In the case of including the above-described temperature sensor, an error caused by a temperature is corrected based on a measured temperature so as to measure the pressure more accurately.

The most significant factor of an error of the vacuum gauge is that even though the pressure is unchanged, a change in ambient temperature causes the deformation of the diaphragm and the structure supporting the piezoelectric element, resulting in the error due to the displacement of the piezoelectric element. In the present embodiment, in order to avoid such an error, except for the one surface side of the diaphragm 40 that is in contact with the gas to be measured, the reference pressure chamber 120 covers the other surface side of the diaphragm 40, the piezoelectric element 50, and the inner structure 310 supporting these components. The reference pressure chamber 120 is originally to set a reference pressure with respect to the pressure of the gas to be measured that is introduced to the pressure introduction chamber 130. In the present embodiment, a high vacuum of the reference pressure chamber 120 is made to function also as the vacuum heat-insulating portion to reduce an influence due to a temperature change, which is the most significant factor that causes the error of the vacuum gauge.

The vacuum heat-insulating portion 120 suppresses convection heat transfer to sufficiently reduce the influence of outside temperature change caused by the convection and received by the piezoelectric element 50.

2. Low Heat-Transfer Rate of Introduction Tube

The present embodiment includes the introduction tube 320, which extends inside and outside the airtight container 300 where the vacuum heat-insulating portion 120 is defined, and which is coupled to the inner structure 310 inside the airtight container 300. Due to solid heat conduction, therefore, the introduction tube 320 transfers outside heat to the inner structure 310.

In view of this, in the present embodiment, at least part of the introduction tube 320 is made of a low heat-transfer material to suppress solid heat conduction to reduce an influence of an outside temperature change received by the piezoelectric element 50. In the present embodiment, of the introduction tube 320 illustrated in FIG. 1, an inside tube (the first portion) 320A disposed inside the airtight container 300 is made of a low heat-transfer material such as zirconia ($ZnO_2$), which is an exemplary metal oxide, and the remainder, namely, an outside tube (the second portion) 320B is made of a metal such as stainless steel (SUS). Alternatively, the outside tube (the second portion) 320B or the whole introduction tube 320 may be made of a low heat-transfer material. At least one of the inside tube (the first portion) 320A and the outside tube (the second portion) 320B of the introduction tube 320 may be made of any low heat-transfer material insofar as the material suppresses heat transfer between a portion to which outside heat is transferred and the inner structure 310.

Figure 2:
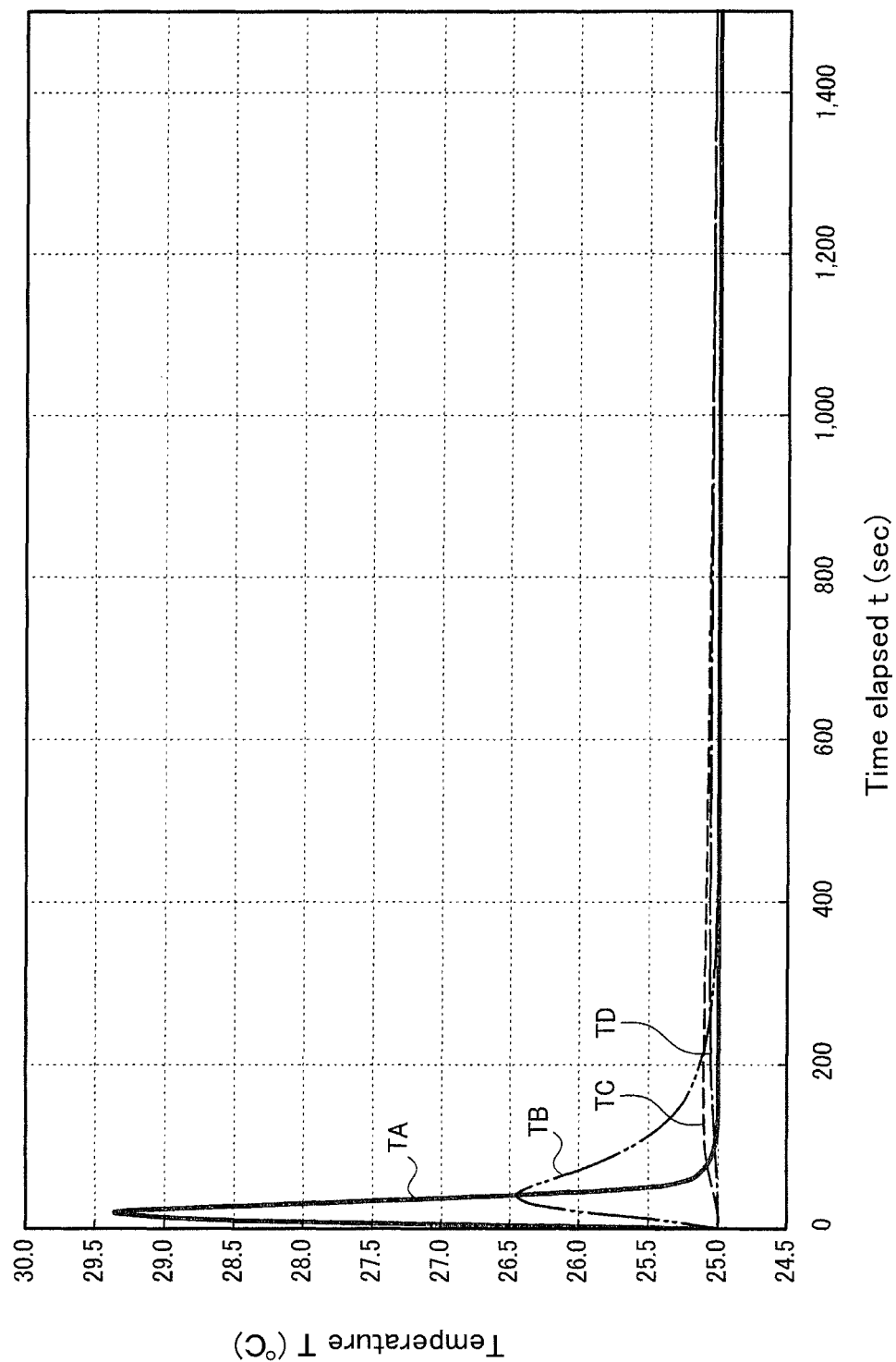
FIG. 2 is a property graph of temperature changes in vacuum gauges in the present embodiment and comparative examples when an outside temperature has been increased from 25° C. to 30° C. in 20 seconds.

FIG. 2 shows experiment data of temperatures $T_B$, $T_C$, and $T_D$ in the vicinity of the piezoelectric element 50 of three kinds of vacuum gauges when an outside temperature $T_A$ has been increased from 25° C. to 30° C. in 20 seconds. The temperature $T_D$ is a temperature in the vacuum gauge in the present embodiment illustrated in FIG. 1, and the temperatures $T_B$ and $T_C$ are temperatures in vacuum gauges in comparative examples 1 and 2. In the comparative example 1, the vacuum gauge, including the introduction tube 320 made of a metal (SUS) but not including the vacuum heat-insulating portion 120 of the vacuum gauge illustrated in FIG. 1, has the temperature $T_B$. In the comparative example 2, the vacuum gauge (including the vacuum heat-insulating portion 120) includes the introduction tube 320 of the vacuum gauge in FIG. 1 made of a metal (SUS), and has the temperature $T_C$. FIG. 2 apparently shows that the temperatures $T_C$ and $T_D$ in the comparative example 2 and in the present embodiment, which include the vacuum heat-insulating portion 120, are kept by far lower than the temperature $T_B$ in the comparative example 1 without the vacuum heat-insulating portion 120. This clearly exhibits the effect of the vacuum heat-insulating portion 120.

Figure 3:
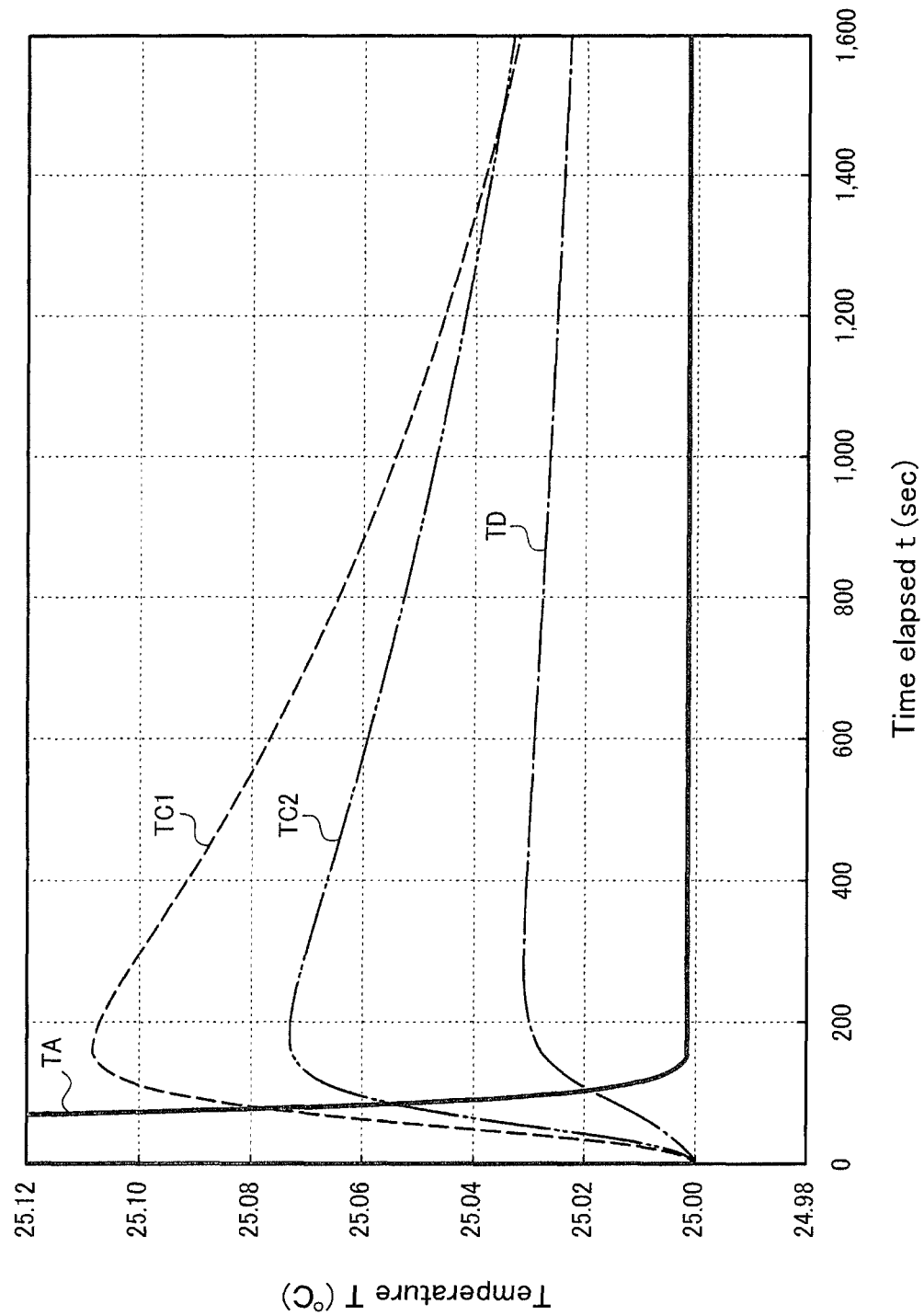
FIG. 3 is a property graph of temperature changes in vacuum gauges in the present embodiment and other comparative examples when an outside temperature has been increased from 25° C. to 30° C. in 20 seconds.

Since FIG. 2 does not clearly show a difference between the present embodiment and the comparative example 2, FIG. 3 further shows different experiment data. In addition to the temperatures $T_A$ and $T_D$ shown in FIG. 2, FIG. 3 shows temperatures $T_{C1}$ and $T_{C2}$. The temperatures $T_{C1}$ and $T_{C2}$ are temperatures in vacuum gauges that include, in a similar manner to the comparative example 2 shown in FIG. 2, the external pressure introduction tube 320 made of SUS, in addition to the vacuum heat-insulating portion 120. However, these vacuum gauges are different only in size of the introduction tube 320. In a comparative example 2-1 in which the temperature $T_{C1}$ has been detected, the introduction tube 320 illustrated in FIG. 1 has an outer diameter d1=d3=5 mm, an inner diameter d2=d4=4 mm, and L1=L2=13.5 cm. In contrast, in a comparative example 2-2 in which the temperature $T_{C2}$ has been detected, the introduction tube 320 illustrated in FIG. 1 has an outer diameter d1=3 mm and an inner diameter d2=2 mm, which are smaller than in the comparative example 2-1, and has the same length L as in the comparative example 2-1. The vacuum gauge in the present embodiment uses the introduction tube 320 of the same size as the comparative example 2-1.

FIG. 3 shows that when the outside temperature $T_A$ has been increased from 25° C. to 30° C. in 20 seconds in the same manner as shown in FIG. 2, the temperature $T_D$ in the present embodiment using the introduction tube 320 partly made of zirconia is kept lower than the temperatures $T_{C1}$ and $T_{C2}$ in the comparative examples 2-1 and 2-2 using the introduction tube 320 made of SUS304. It has been understood that although a temperature increase is suppressed in the comparative example 2-2 in which the introduction tube 320 has a smaller cross-sectional area than in the comparative example 2-1, a temperature increase is suppressed further in the present embodiment using the same size as the comparative example 2-1 than in the comparative example 2-2. An amount of solid heat conduction is reduced by decreasing a cross-sectional area of the introduction tube 320 or increasing the length L. However, in order to reduce the amount of solid heat conduction while maintaining a general size as an introduction tube, that is, the outer diameter d1=d3=5 mm, the inner diameter d2=d4=4 mm, and L1=L2=13.5 cm, it is effective to change the material as in the present embodiment.

The above-described results are from a difference between a heat conductivity [16.3 W/m·K] of SUS304 and a heat conductivity [3 W/m·K] of zirconia. In view of this, at least one of the inside tube (the first portion) 320A and the outside tube (the second portion) 320B of the introduction tube 320 used in the present embodiment may be made of a material having a heat conductivity of 2 to 10 W/m·K, which is sufficiently lower than heat conductivities of general metals, preferably 2 to 7 W/m·K, more preferably 2 to 5 W/m·K.

A calculation result of a temperature increase rate of the temperature $T_D$ in the present embodiment is $1 \times 10^{-4}$° C./sec at maximum. When the temperature increase rate in the vacuum gauge (in the vicinity of the piezoelectric element) in increasing the outside temperature from 25° C. to 30° C. in 20 seconds is $5 \times 10^3$ (° C./sec) or less, temperature correction at approximately every two seconds becomes possible with temperature accuracy of at least 0.01° C. to make measurement follow temperature correction on a real-time basis.

In order to make the heat conductivity of the first portion 320A of the introduction tube 320 lower than the heat conductivity of the second portion 320B while maintaining a strength of the second portion 320B coupled to the flange 110, the size of the first portion 320A may be changed to be smaller than the size of the second portion 320B (d1<d3, d2<d4). For example, a first tube volume ($\pi \cdot (d2/2)^2 \times L1$) of the first portion 320A of the introduction tube 320 may be made ½ to ⅙ of a second tube volume ($\pi \cdot (d4/2)^2 \times L2$) of the second portion 320B. It should be noted that a thickness [(d1−d2)/2] of the first portion 320A is supposed to be substantially equal to a thickness [(d3−d4)/2] of the second portion 320B. As the tube volume of the first portion 320A of the introduction tube 320 is decreased to ½ to ⅙, the heat conductivity is also decreased in proportion to the tube volume. Generally, a decrease in the tube volume causes a conductance of the introduction tube 320 to decrease, thereby leading to a reduction in a response speed of the vacuum gauge. However, the reduction in a response speed is almost non-critical when a volume of a pressure measurement chamber in the volume of the pressure introduction chamber 130, except for the volume of the introduction tube 320, is made decreased.

In the present embodiment, the stopper 29 to restrict excessive displacement of the diaphragm 40 toward the inside of the airtight container 300 may be further disposed at the inner structure 310. The stopper 29 may be disposed on one of a proximal end portion 23, a reinforcement portion 25, and the bonding portion 60. As illustrated in FIG. 1, a gap S is defined between the diaphragm 40 and the stopper 29 disposed on the proximal end portion 23 of the inner structure 310. The stopper 29 restricts displacement of the diaphragm 40 to avoid breakage of the piezoelectric element 50 at the upper limit of the pressure (high pressure) measured by the vacuum gauge and plastic deformation of the diaphragm 40. Alternatively, the stopper 29 disposed on the proximal end portion 23 or the reinforcement portion 25 of the inner structure 310 may restrict displacement of the diaphragm 40 or the bonding portion 60.

3. Detailed Configuration of Inner Structure

Figure 4A:
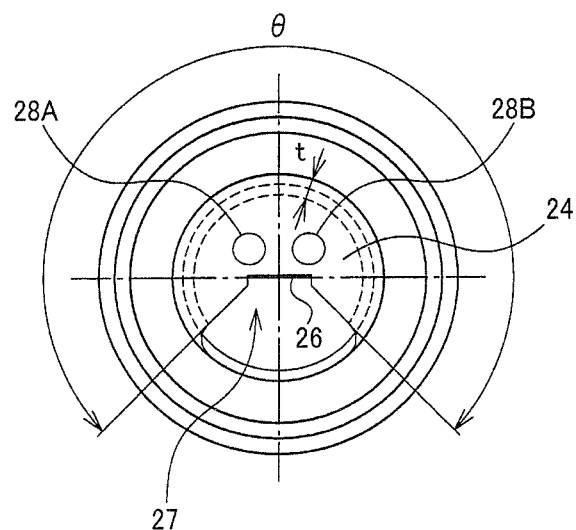
FIG. 4A and FIG. 4B are a plan view and a cross-sectional view of a state in which a diaphragm is attached to an inner structure.
Figure 4B:
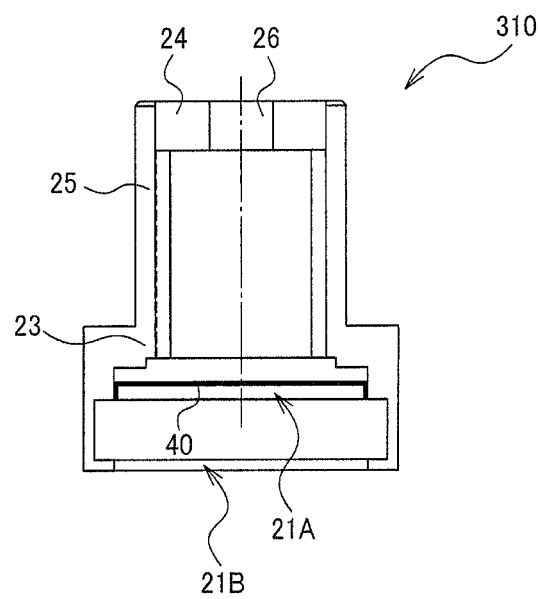

The inner structure 310 of the vacuum gauge will be described below in an order of assembly with reference to FIGS. 4A, 4B, 5A, and 5B. FIGS. 4A and 4B are a plan view and a cross-sectional view of the inner structure 310. The inner structure 310 includes the proximal end portion 23 to which a circumferential edge portion of the diaphragm 40 and the first portion 320A of the introduction tube 320 are coupled, a securing portion 24 to which the other end (the upper end in FIG. 1) of the piezoelectric element 50 is secured, and the reinforcement portion 25 to which the proximal end portion 23 and the securing portion 24 are coupled. The diaphragm 40 to seal a first opening 21A of the proximal end portion 23 and the introduction tube 320 coupled to a second opening 21B of the proximal end portion 23 are airtightly secured by, for example, laser welding.

The reinforcement portion 25 is a tubular member having a thickness "t", and the securing portion 24 is equivalent to a ceiling wall disposed on one end of the tubular member. The securing portion 24 has a bonding surface 26 to which a securing end portion of the piezoelectric element 50 is bonded. The reinforcement portion 25 is disposed in a range of $\theta=(360°/N)$ ($1<N\leq2$) around a hollow (an inner space of the reinforcement portion 25) where the piezoelectric element 50 is disposed. That is, the reinforcement portion 25 is disposed in an angle range of 180° or more and less than 360° around the piezoelectric element 50. The reinforcement portion 25 steadfastly supports the securing portion 24 to which the other end of the piezoelectric element 50 is secured. Thus, the piezoelectric element 50, one end of which is displaced along with the diaphragm 40, has the other end secured and supported to the securing portion 24 so as to cause a stress dependent only on the pressure to be exerted on the piezoelectric element 50. In other words, the inner structure 310 includes a cut portion 27 in an angle range of $(360°-\theta)$ in plan view, and the cut portion 27 communicates with the hollow (the inner space of the reinforcement portion 25). In the present embodiment, it is supposed, for example, that $\theta=270°$, and the cut portion 27 is formed in an angle range of $(360°-\theta)=90°$ in plan view. Moreover, at least one such as two holes 28A and 28B, extending through the securing portion 24 in an axial direction A in FIG. 1, is formed in the securing portion 24.

Figure 5A:
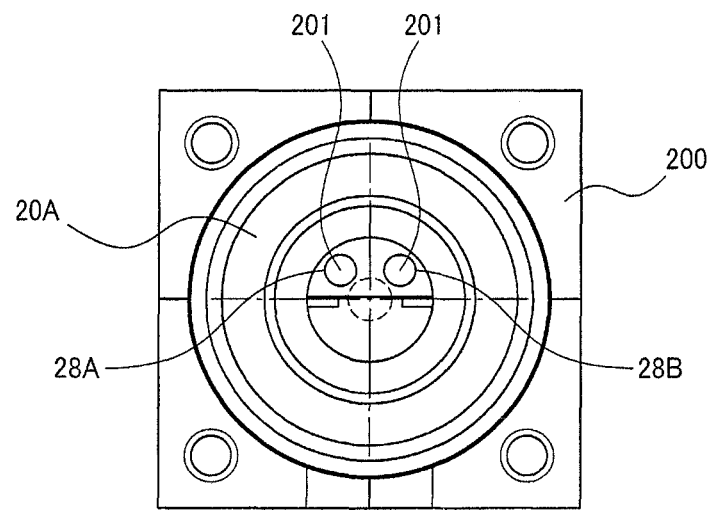
FIG. 5A and FIG. 5B are a plan view and a cross-sectional view of a state in which a bonding portion is positioned and secured to the inner structure.
Figure 5B:
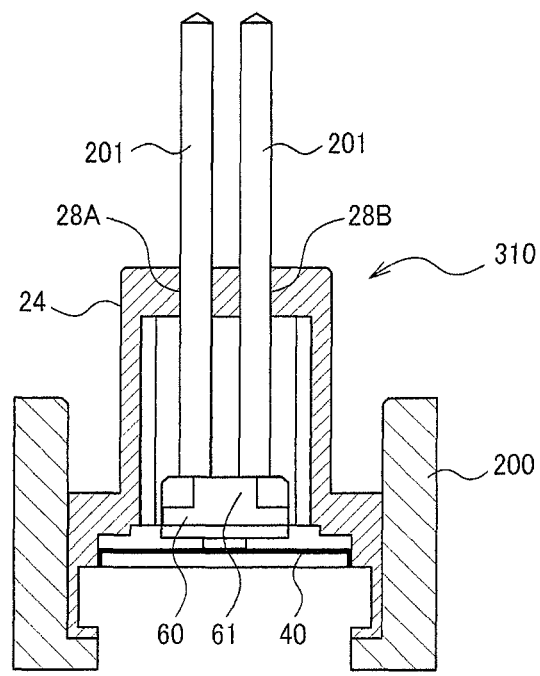
Figure 6A:
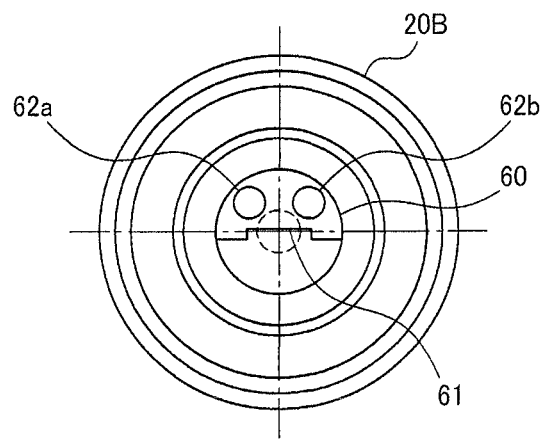
FIG. 6A and FIG. 6B are a plan view and a cross-sectional view of a state in which the diaphragm is attached to the inner structure.
Figure 6B:
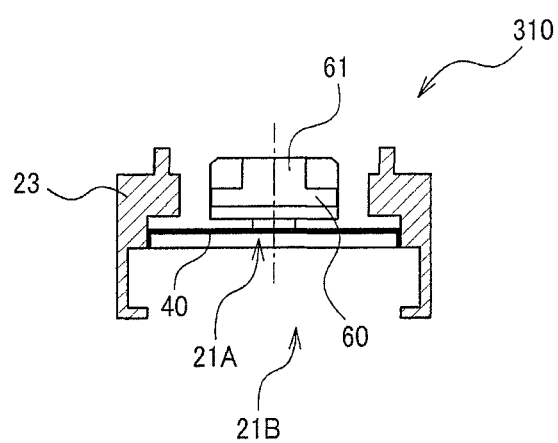

FIGS. 5A and 5B are a plan view and a cross-sectional view of a state in which the bonding portion 60 is secured to the inner structure 310 held in a jig 200. As illustrated in FIG. 5B, positioning rods 201 are respectively inserted in the two holes 28A and 28B formed in the securing portion 24 of the inner structure 310. Two holes (although not illustrated, two holes overlapping the two holes 28A and 28B in FIG. 5A in plan view and being equivalent to two holes 62a and 62b illustrated in FIG. 6A) are formed in the bonding portion 60 in a similar manner to the securing portion 24 of the inner structure 310. Lower ends of the positioning rods 201 are also inserted in these two holes in a state illustrated in FIG. 5B. Thus, the bonding portion 60 is positioned with respect to the inner structure 310. In the state illustrated in FIG. 5B, the bonding portion 60 is, for example, adhered to the diaphragm 40. At this time, the two holes formed in the bonding portion 60 may be such non-through holes as to have bottom portions on a side where the diaphragm 40 is located. When the positioning rods 201 are inserted in the non-through holes, self-weights of the positioning rods 201 are utilized as weights in securing the bonding portion 60 to the diaphragm 40. In addition to the self-weights of the two positioning rods 201, additional weights may be coupled to the two positioning rods 201. The bonding portion 60 has a bonding surface (fourth plane) 61 to which a movable end (the lower end illustrated in FIG. 1) of the piezoelectric element 50 is bonded. As a result of the above-described assembly, the bonding surface 61 of the bonding portion 60 and the bonding surface 26 of the securing portion 24 are located on an identical line and in parallel to each other.

The piezoelectric element 50 is made of a single-crystal quartz plate and has one end adhered to the bonding surface (second plane) 61 of the bonding portion 60 and the other end adhered to the bonding surface (fourth plane) 26 of the securing portion 24. At this time, as illustrated in FIG. 4A, since the inner structure 310 includes the cut portion 27 in a range of 90° ($=360°-\theta$), disposing the piezoelectric element 50 and making the weights function with respect to the piezoelectric element 50 at the time of adhesion are performed through the cut portion 27. This improves workability.

According to the present embodiment, the securing portion 24 is integrally formed with the inner structure 310 including the first opening 21A sealed by the diaphragm 40. With this arrangement, while the movable end of the piezoelectric element 50 is displaced along with the diaphragm 40, the secured end of the piezoelectric element 50 is secured to the securing portion 24 integrated with the inner structure 310 and is not displaced. This enables the piezoelectric element 50 to accurately detect the pressure exerted on the diaphragm 40 based on a displacement of the diaphragm 40.

Moreover, the securing portion 24 is coupled to the proximal end portion 23 with the reinforcement portion 25. The reinforcement portion 25 is formed in the range of $(360°/N)$ ($1<N\leq2$) around the hollow where the piezoelectric element 50 is disposed. That is, the reinforcement portion 25 is disposed in the angle range of 180° or more and less than 360° around the piezoelectric element 50 so as to suppress deformation of the reinforcement portion 25. Consequently, even if a positive or negative pressure exerted on the diaphragm 40 is large, the secured end of the piezoelectric element 50 is not displaced with respect to the inner structure 310. This enables the piezoelectric element 50 to accurately detect the pressure exerted on the diaphragm 40 based on a displacement of the diaphragm 40.

Obviously, the present disclosure is not limited to the above-described embodiment, and various modifications are possible within the scope of the subject matter of the present disclosure. For example, the configuration of the embodiment described above is also applicable to measurement devices to measure pressures other than a vacuum. Although the number N used for defining $(360°/N)$ indicative of the range where the reinforcement portion is formed is most preferable when $1<N\leq2$ as described above, pressure measurement with a predetermined accuracy is possible even when $1<N\leq4$.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A vacuum gauge comprising: an introduction tube; a diaphragm configured to be displaced by a gas to be measured that is introduced from the introduction tube; a piezoelectric element having one end coupled to the diaphragm, and configured to be displaced along with the diaphragm; an inner mounting structure to which a circumferential edge of the diaphragm and another end of the piezoelectric element are secured, the inner mounting structure being coupled to the introduction tube; and an airtight container configured to airtightly enclose the introduction tube and the inner mounting structure, the inner mounting structure, the introduction tube, and the diaphragm airtightly partitioning a space in the airtight container into a pressure introduction chamber to which the gas to be measured is introduced on one surface side of the diaphragm, and a reference pressure chamber on another surface side of the diaphragm, the reference pressure chamber being set at a high vacuum that is lower than a pressure lower limit of the gas to be measured.

2. The vacuum gauge as defined in claim 1, the reference pressure chamber being set at the high vacuum of $1/1000$ or less of the pressure lower limit of the gas to be measured.

3. The vacuum gauge as defined in claim 1, the introduction tube comprising a first portion and a second portion, the first portion being coupled to the inner mounting structure and enclosed by the airtight container, the second portion protruding outward from the airtight container, and one of the first portion and the second portion having a lower heat conductivity than another of the first portion and the second portion.

4. The vacuum gauge as defined in claim 3,
the first portion of the introduction tube having a first tube volume that is ½ to ⅙ of a second tube volume of the second portion of the introduction tube.

5. The vacuum gauge as defined in claim 1, the introduction tube comprising a first portion and a second portion, the first portion being coupled to the inner mounting structure and enclosed by the airtight container, the second portion protruding outward from the airtight container, and at least one of the first portion and the second portion comprising a material having a heat conductivity of 2 to 10 W/m-K.

6. The vacuum gauge as defined in claim 1, the inner mounting structure comprising: a proximal end portion to which the circumferential edge of the diaphragm is secured; a securing portion to which the other end of the piezoelectric element is secured; and a reinforcement portion extending from the proximal end portion to the securing portion along a longitudinal direction of the piezoelectric element, the reinforcement portion being disposed in a range of $(360°/(1<N\leq2))$ around a region where the piezoelectric element is disposed in a cross section of the reinforcement portion perpendicular to the longitudinal direction.

7. The vacuum gauge as defined in claim 1, the inner mounting structure comprising a stopper configured to restrict excessive displacement of the diaphragm into the airtight container.

* * * * *